July 12, 1938.  S. B. WINN  2,123,820
AUTOMATIC BRAKING AND UNCOUPLING DEVICE
Filed Dec. 30, 1936    2 Sheets-Sheet 1
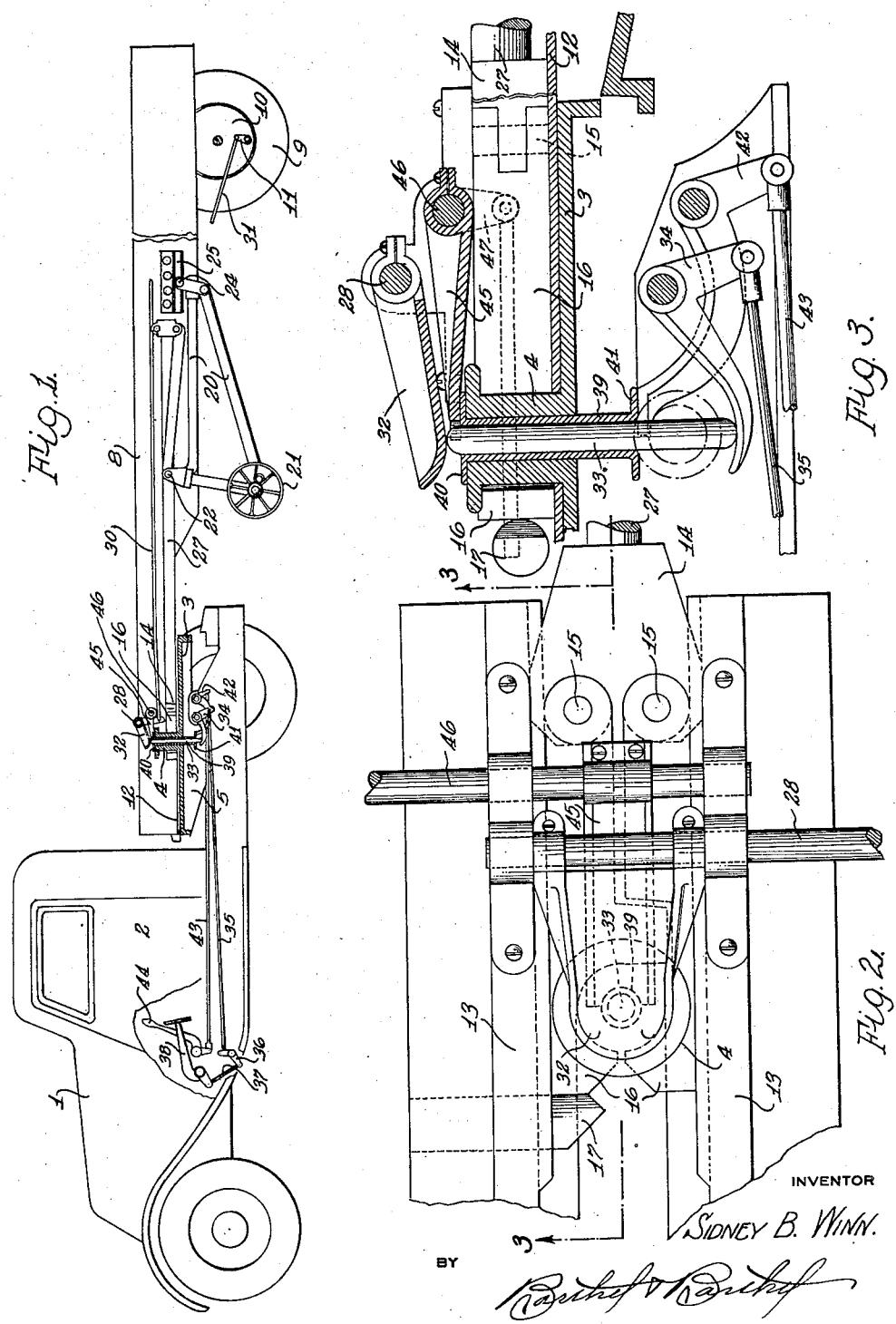
INVENTOR
SIDNEY B. WINN.
BY
ATTORNEYS July 12, 1938.  S. B. WINN  2,123,820
AUTOMATIC BRAKING AND UNCOUPLING DEVICE
Filed Dec. 30, 1936  2 Sheets—Sheet 2
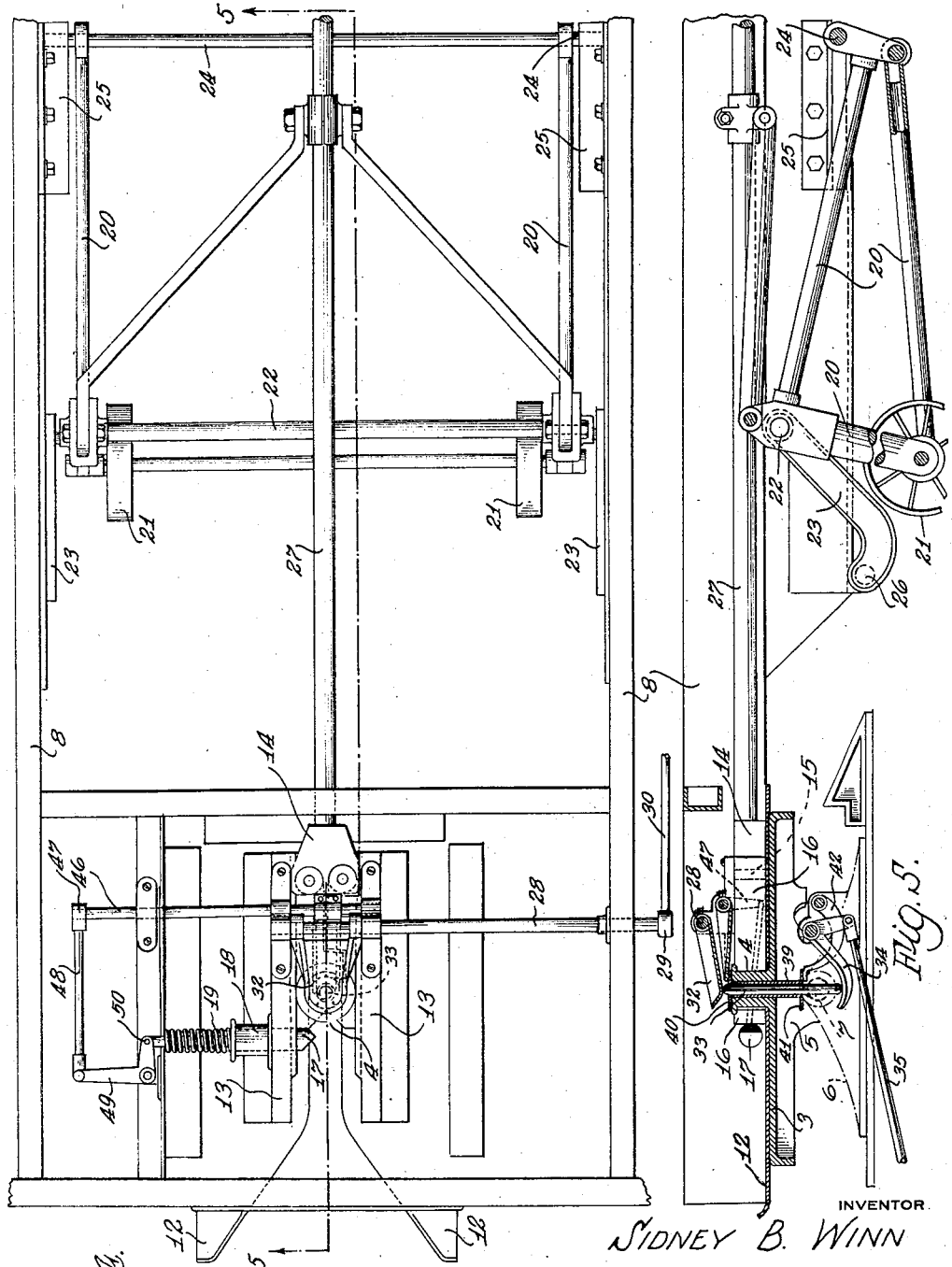
INVENTOR.
SIDNEY B. WINN
BY
ATTORNEYS Patented July 12, 1938

2,123,820

UNITED STATES PATENT OFFICE 2,123,820

AUTOMATIC BRAKING AND UNCOUPLING DEVICE

Sidney B. Winn, Lapeer, Mich.

Application December 30, 1936, Serial No. 118,371

8 Claims. (Cl. 280—33.1)

The present invention pertains to tractors and semi-trailers and more particularly to the means for coupling and uncoupling the tractor and trailer and the control or actuating means therefor.

The primary object of the present invention is to provide means for coupling a semi-trailer to a tractor and control mechanism for the coupling means adapted to cause actuation of the same by manually operated means disposed within the cab of the tractor so that it is not necessary for the operator to leave the cab of the tractor in order to uncouple the same from the trailer.

Another object of the present invention is to provide in the cab of a tractor, means for causing uncoupling of a trailer from the tractor, said means being operable to apply brakes on the trailer incident to the uncoupling operation. In this connection there are provided brake actuating means on the trailer to be operated by means on the tractor and means forming part of the uncoupling device for operating the brake actuating means to insure application of the trailer brakes prior to withdrawal of the tractor from beneath the forward end of the trailer.

With the above and other ends in view the invention consists in matters hereinafter set forth and more particularly pointed out in the appended claims, reference being had to the accompanying drawings, in which Figure 1 is a side elevation of a coupled tractor and semi-trailer with parts broken away and in cross section;

Fig. 2 is a plan of a detail;

Fig. 3 is a cross section taken on the line 3—3 of Fig. 2;

Fig. 4 is a fragmentary plan, and

Fig. 5 is a cross section taken on the line 5—5 of Fig. 4.

Like characters of reference are employed throughout to designate corresponding parts.

In the drawings the numeral 1 generally designates a tractor having a cab 2 and a fifth wheel 3 having a central upwardly extending boss forming a king pin 4. The fifth wheel 3 is pivotally supported relative to the tractor and the pivotal support therefor comprises downwardly extending brackets 5 on the fifth wheel which are secured to brackets 6 on the tractor by stub shafts 7. The numeral 8 designates the trailer frame having rear supporting wheels 9 equipped with brakes 10 and levers 11 for actuating the same. The front end of the trailer frame 8 is provided with a forked skid plate 12 adapted to rest upon the fifth wheel 3 with the king pin 4 disposed within the forked portion of the skid plate. Mounted on top of the skid plate 12 are coupling jaw guides 13 and slidably mounted between the guides 13 is a coupling head 14. Pivotally attached as at 15 to the head 14 are two coupling jaws 16 having notches adapted to receive the king pin 4. When the coupling jaws 16 are located between the guides 13 it is obvious that they cannot be moved pivotally and accordingly the king pin is retained in the notches thereof and the trailer is thus coupled to the tractor. The parts are shown in their coupled position in the several views and it will be understood that in order to uncouple the tractor and trailer, or in other words release the king pin from the notches in the coupling jaws the coupling head must be moved in a left hand direction in order to carry the coupling jaws beyond the ends of the guides 13 which restrict or prevent their pivotal movement. When the coupling jaws are moved out of the guides 13 they are free to pivot and swing outwardly so that the king pin may be pulled out of the notches in the coupling jaws by movement of the tractor relative to the trailer.

The movement of the tractor relative to the trailer which is necessary in order to move the jaws 16 out of the guides 13 is in the same direction as movement of the tractor for the purpose of towing the trailer. Therefore means must be provided to lock the coupling jaws 16 in their coupled position between the guides 13 when it is desired to tow the vehicle. The means which is provided for this purpose comprises a slidable latch bolt 17 slidably mounted in a tubular bearing 18 carried by one of the guides 13 and a coiled spring 19 is sleeved thereon to normally hold one end thereof projecting into the space between the two guides 13 and in a position preventing movement of the coupling jaws towards the left hand end of the guides 13 when they are in the position shown in the drawings by way of example.

The trailer is equipped with a leg for supporting the forward end thereof when it is uncoupled from the tractor. The leg comprises a triangular frame 20 having wheels 21 rotatably mounted at the bottom thereof. The forward upper end has a transversely extending shaft 22 whose ends project outwardly from the sides of the frame 20 and are received in inclined guides 23. The rear upper end of the frame 20 carries a transversely extending shaft 24 whose ends project outwardly from the sides of the frame 20 into horizontally extending guides 25. When the frame 20 is moved in a forward direction the shaft 22 moves downwardly in the inclined guide 23 to carry the wheels 21 to a point in close proximity to the ground so that when the trailer is disconnected from the tractor the ends of shaft 22 are caused to be moved upwardly by the weight of the trailer into retaining portions 26 where they support the weight of the trailer. The frame 20 is connected by a rod 27 to the coupling head 14 so that movement of the frame becomes incident to and dependent upon movement of the coupling head.

A rotatable shaft 28 is mounted in the trailer frame 8 and carries a lever 29 having a drag link 30 connected thereto and extending rearwardly relative to the trailer. The brake actuating levers 11 have drag links 31 connected thereto and it will be understood, although it is not shown in the drawings, that the drag link 30 is connected to the drag links 31. The shaft 28 is provided with an arm 32 extending over the king pin 4 and engaged by a push pin 33 slidably mounted in the king pin. The lower end of the push pin is engaged by a bell crank lever 34 and a drag link 35 connects the bell crank lever 34 to another bell crank 36 which is connected by a link 37 to a conventional brake pedal 38 in the cab 2 of the tractor. Thus when the pedal 38 is depressed as a result of the operator placing pressure thereon the drag link 35 rocks the bell crank 34 to slide the push pin 33 and through engagement with the arm 32 rocks the shaft 28 and lever 29 to move the drag link 30, drag links 31 and the brake actuating levers 11 to apply the trailer brakes.

Surrounding the push pin 33 is provided a sleeve 39 which is slidable relative to the push pin and relative to the king pin 4. On the upper end of the sleeve 39 is formed a flange 40 and on the lower end is formed a flange 41. The flange 41 on the lower end is engaged by a bell crank lever 42 having a drag link 43 connected thereto and extending forwardly adjacent to the cab 2 where it is connected to a lever 44 in the cab. The upper flange 40 is engaged by an arm 45 on a shaft 46 rotatably mounted on the trailer. A lever 47 is mounted on the shaft 46 and is connected by a rod 48 to a bell crank lever 49. The bell crank lever 49 is connected as at 50 to the latch bolt 17.

In operating the device to uncouple the tractor from the trailer the lever 44 is pulled rearwardly by the operator and through the link 43 the bell crank 42 is rocked. The bell crank lever 42 moves the sleeve 39 upwardly and the flange 40 thereon causes the arm 45 to rock the shaft 46 so that the lever 47 and link 48 rock the bell crank lever 49 and retract the latch bolt 17. At the same time the arm 45, as a result of its movement caused by the sleeve, engages the arm 32 and raises the same so as to rock the shaft 28 and lever 29 and move the links 30 and 31 and brake actuating levers 11. Thus it becomes apparent that the trailer brakes are caused to be applied when the latch bolt 17 is retracted. After the latch bolt is retracted the tractor is moved relative to the trailer and during such movement the king pin 4 causes the coupling jaws 16 and coupling head 14 to slide between the guides 13. The sliding movement of the coupler head 14 moves the rod 27 and leg frame 20 forwardly so that the shaft 22 rides down the inclined guide 23 to its trailer supporting position previously described. When the coupling jaws 16 are moved a sufficient distance so that pivotal movement is no longer prevented by the guides 13 the king pin forces them apart and releases itself so that the fifth wheel 3 may be withdrawn from beneath the skid plate 12.

Although a specific embodiment of the present invention has been illustrated and described it is to be understood that various changes may be made within the scope of the appended claims without departing from the spirit of the invention, and such changes are contemplated.

What I claim is:—

1. In combination with a tractor and a trailer and a king pin providing a connection therebetween, brakes on said trailer, a retractible support on said trailer, latch means for said retractible support, a pair of relatively slidable elements slidably mounted in said king pin, means on said trailer for operatively connecting said relatively slidable elements with said brakes and latch means respectively, and means on said tractor for independently moving said relatively slidable elements.

2. In combination with a tractor and a trailer and a king pin providing a connection therebetween, brakes on said trailer, a retractible support on said trailer, a latch for said retractible support, a sleeve slidably mounted in said king pin, a push pin slidable in said sleeve, means on said tractor engaging said sleeve and pin for imparting movement thereto, means on said trailer adapted to be moved by said sleeve and pin, and means for connecting said last named means independently to said brakes and latch.

3. In combination with a tractor and a trailer and a king pin providing a connection therebetween, brakes on said trailer, a retractible support on said trailer, latch means for said retractible support, a pair of relatively nested slidable elements mounted in said king pin, means on said tractor for independently moving said elements, means on said trailer adapted to be independently moved by said elements, and means connecting said last named means independently to the brakes and latch means respectively.

4. In combination with a tractor and a trailer and a king pin providing a connection therebetween, coupling means on said trailer, a latch for said coupling means, brakes on said trailer, a pair of relatively slidable elements slidably mounted in said king pin, means on said trailer for operatively connecting said relatively slidable elements with said brakes and latch respectively, and means on said tractor for independently moving said relatively slidable elements.

5. In combination with a tractor and a trailer and a king pin providing a connection therebetween, coupling means on said trailer, a latch for said coupling means, brakes on said trailer, a pair of relatively nested slidable elements mounted in said king pin, means operatively connecting said slidable elements to said brakes and latch respectively, means on said tractor for independently sliding one of said elements for operating said brakes, and means for sliding the other of said elements for simultaneously operating said latch and said brakes.

6. In combination with a tractor and a trailer and a king pin providing a connection therebetween, brakes on said trailer, latch means on said trailer for locking said connecting means to prevent separation of said tractor and trailer, a pair of relatively slidable elements slidably mounted in said king pin, means on said trailer for operatively connecting said relatively slidable elements with said brakes, means on said trailer for operatively connecting said latch means with said brakes, and means on said tractor for independently moving said relatively slidable elements.

7. In combination with a tractor and a trailer and a king pin providing a connection therebetween, brakes on said trailer, a retractible support on said trailer, latch means on said trailer for locking said retractible support, a pair of relatively slidable elements slidably mounted in said king pin, means on said tractor for independently moving said relatively slidable elements, and means on said trailer for operatively connecting said relatively slidable elements with said brakes and said latch means respectively, said latch connecting means being adapted to operate said brake connecting means by actuation thereof by its respective slidable element.

8. In combination with a tractor and a trailer and a king pin providing a connection therebetween, coupling means on said trailer, a retractible support on said trailer, a latch for locking said coupling means and retractible support simultaneously, brakes on said trailer, a pair of relatively slidable elements slidably mounted in said king pin, means on said trailer for operatively connecting said relatively slidable elements with said brakes and latch respectively, and means on said tractor for independently moving said relatively slidable elements.

SIDNEY B. WINN.